(12) United States Patent
Burwinkel et al.

(10) Patent No.: US 11,304,013 B2
(45) Date of Patent: Apr. 12, 2022

(54) ASSISTIVE LISTENING DEVICE SYSTEMS, DEVICES AND METHODS FOR PROVIDING AUDIO STREAMS WITHIN SOUND FIELDS

(71) Applicant: Starkey Laboratories, Inc., Eden Prairie, MN (US)

(72) Inventors: Justin R. Burwinkel, Eden Prairie, MN (US); Peter J. Tetrick, Chaska, MN (US); Jeffrey Paul Solum, Greenwood, MN (US); Thomas Scheller, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 107 days.

(21) Appl. No.: 16/784,947

(22) Filed: Feb. 7, 2020

(65) Prior Publication Data

US 2020/0260199 A1 Aug. 13, 2020

Related U.S. Application Data

(60) Provisional application No. 62/802,996, filed on Feb. 8, 2019.

(51) Int. Cl.
*H04R 25/00* (2006.01)
*G10L 13/08* (2013.01)
*H04S 7/00* (2006.01)

(52) U.S. Cl.
CPC .......... *H04R 25/554* (2013.01); *G10L 13/086* (2013.01); *H04S 7/304* (2013.01); *H04S 2420/01* (2013.01)

(58) Field of Classification Search
USPC ....... 381/135, 315, 322, 324, 328, 23.1, 312
See application file for complete search history.

(56) References Cited

U.S. PATENT DOCUMENTS 5,461,371 A 10/1995 Matsumoto et al.
6,498,955 B1 12/2002 Mccarthy et al.
(Continued)

FOREIGN PATENT DOCUMENTS

EP 2725818 4/2014
EP 3176782 6/2017
(Continued)

OTHER PUBLICATIONS

"International Search Report and Written Opinion," for PCT Application No. PCT/US2020/017222 dated Jul. 6, 2020 (21 pages).
(Continued)

*Primary Examiner* — Yosef K Laekemariam
(74) *Attorney, Agent, or Firm* — Pauly, DeVries Smith & Deffner LLC

(57) ABSTRACT

Embodiments herein relate to assistive listening devices and systems for providing audio streams to device wearers within sound fields. In an embodiment an assistive listening device is included having a control circuit, an electroacoustic transducer for generating sound in electrical communication with the control circuit, a power supply circuit in electrical communication with the control circuit, and a communications circuit in electrical communication with the control circuit. The control circuit can be configured to issue a communication to an audio communication device or audio provisioning device including at least one of a language preference, a set of hearing requirements, data regarding a presentation delay, and an authorization status identifier, digital code, digital token, or digital key specific to a wearer of the assistive listening device. Other embodiments are also included herein.

18 Claims, 10 Drawing Sheets

(56) References Cited

U.S. PATENT DOCUMENTS

| | | |
|---|---|---|
| 8,923,543 B2 | 12/2014 | Sacha et al. |
| 9,100,694 B1 | 8/2015 | Chandel et al. |
| 9,167,356 B2 | 10/2015 | Higgins et al. |
| 9,848,273 B1 | 12/2017 | Helwani et al. |
| 2009/0031336 A1 | 1/2009 | Chavez et al. |
| 2012/0060176 A1 | 3/2012 | Chai et al. |
| 2012/0102409 A1 | 4/2012 | Fan et al. |
| 2014/0223461 A1 | 8/2014 | Hatambeiki et al. |
| 2018/0204576 A1* | 7/2018 | Dhoot .................. G10L 17/00 |
| 2018/0317837 A1 | 11/2018 | Burwinkel et al. |
| 2018/0343527 A1 | 11/2018 | Edwards |

FOREIGN PATENT DOCUMENTS

| | | | |
|---|---|---|---|
| EP | 3176782 | * | 7/2017 |
| WO | 2017120065 | | 7/2017 |
| WO | 2020163722 | | 8/2020 |

OTHER PUBLICATIONS

"Invitation to Pay Additional Fees," for PCT Application No. PCT/US2020/017222 dated May 13, 2020 (17 pages).

\* cited by examiner

ASSISTIVE LISTENING DEVICE SYSTEMS, DEVICES AND METHODS FOR PROVIDING AUDIO STREAMS WITHIN SOUND FIELDS

This application claims the benefit of U.S. Provisional Application No. 62/802,996, filed Feb. 8, 2019, the content of which is herein incorporated by reference in its entirety.

FIELD

Embodiments herein relate to assistive listening devices and assistive listening device systems for providing audio streams to device wearers within sound fields.

BACKGROUND

Assistive listening systems can be used in various contexts for both people with hearing disabilities and those with normal hearing. By way of example, assistive listening systems can be used to stream audio to an assistive listening device wearer to provide a particular language translation to the wearer. Assistive listening systems can also be used to stream audio to an assistive listening device wearer in a manner sufficient to accommodate the device wearer's unique listening requirements. This may arise in various contexts, such as a theater, a concert hall, a commercial venue, a conference, and the like.

SUMMARY

Embodiments herein relate to assistive listening devices and assistive listening device systems for providing audio streams to device wearers within sound fields. In an embodiment an assistive listening device is included having a control circuit, an electroacoustic transducer for generating sound in electrical communication with the control circuit, a power supply circuit in electrical communication with the control circuit, and a communications circuit in electrical communication with the control circuit. The control circuit can be configured to issue a communication to an audio communication device or audio provisioning device including at least one of a language preference specific to a wearer of the assistive listening device, a set of hearing requirements specific to a wearer of the assistive listening device, data regarding a presentation delay specific to the assistive listening device, and an authorization status identifier, digital code, digital token, or digital key specific to a wearer of the assistive listening device.

In an embodiment, a method of operating an assistive listening device is included, the method including storing configuration data on the assistive listening device, the configuration data comprising at least one of presentation delays of the assistive listening device, a language preference of an individual associated with the assistive listening device, hearing requirements of the individual associated with the assistive listening device, an authorization status of either the assistive listening device or an individual associated with the assistive listening device, and issuing a communication from the assistive listening device to an audio communication device or audio provisioning device including at least one of piece of the configuration data.

In an embodiment, an audio communication device or audio provisioning device is included having a control circuit, a power supply circuit in electrical communication with the control circuit, a communications circuit in electrical communication with the control circuit. The audio communication device or audio provisioning device can be configured to receive communications regarding a plurality of assistive listening devices, the communications comprising at least one of a language preference specific to a wearer of an assistive listening device, a set of hearing requirements specific to a wearer of an assistive listening device, data regarding a presentation delay specific to an assistive listening device, an authorization status specific to a wearer of an assistive listening device, and classification data regarding the listening environment. The audio communication device or audio provisioning device can further be configured to select appropriate audio streams for assistive listening devices from which communications have been received based on the received communications from the plurality of assistive listening devices and to send the selected audio streams to the plurality of assistive listening devices.

Components of system herein, such as an audio communication device or audio provisioning device, can also be leveraged to transmit other information to assist an assistive listening device wearer. For example, additional information can be used in the context of audio streaming or in the context of a sensor network. Additional capabilities include transmitting and receiving closed captioning data and streaming video or other cues to a remote device. In some embodiments, tactile displays such as braille transcription or haptic feedback may be provided to the user. Other capabilities can include transmitting data regarding the location and/or tracking of the hearing device, which can allow for customized head-related transfer functions (HRTF) to be applied to the audio stream. Data regarding the location and/or tracking of the assistive listening device can also allow for location-dependent filter coefficients to be applied by the assistive listening device based upon known impulse room responses.

In an embodiment, an audio communication device, audio provisioning device, or assistive listening device accessory is included herein. Such as device can include a control circuit, a power supply circuit in electrical communication with the control circuit, and a communications circuit in electrical communication with the control circuit. The device can be configured to evaluate one or more audio streams to determine the language of the audio, compare the language to a language preference of a wearer of an assistive listening device, and transmit the audio stream to the assistive listen device when the language of the audio matches the language preference.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
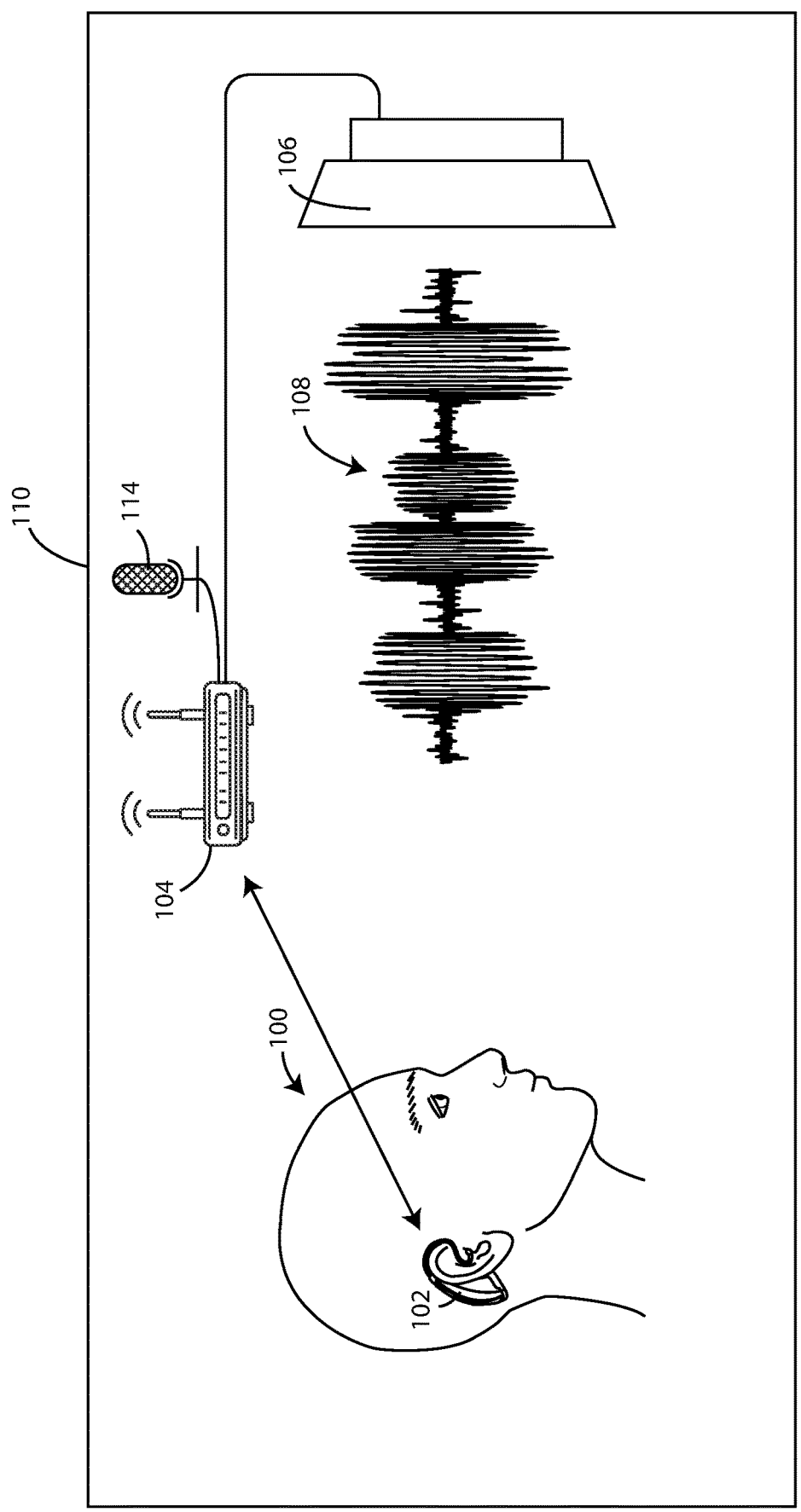
FIG. 1 is a schematic view of an assistive listening device wearer with an audio provisioning device in a sound field in accordance with various embodiments herein.

While embodiments are susceptible to various modifications and alternative forms, specifics thereof have been shown by way of example and drawings and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As referenced above, assistive listening systems can be used in various contexts for both people with hearing disabilities and those with normal hearing. However, many existing systems only broadcast one language at a time. Thus, if multiple languages are required in a given context, several systems must be utilized. In addition, wireless channel overcrowding can become an issue if there are too many simultaneous wireless audio streams being broadcast within a given area or sound field.

Embodiments herein can provide features to broadcast audio streams in a more efficient manner. In various embodiments, the system can automatically determine when to broadcast alternative languages. In various embodiments, the system can also automatically determine which alternative languages to broadcast. In some embodiments, the system can determine whether to broadcast a pre-recorded audio stream or to perform real-time language translation. In some cases, the system can also determine when and how to optimize bandwidth usage of existing and/or required audio streams to enable a greater number of audio streams to be broadcast. In some cases, the system can also determine when and how to optimize bandwidth usage of existing and/or required audio streams to enable higher audio quality audio streams to be broadcast. In various embodiments, the system can selectively provide audio streams only to those device users who are authorized. Other features of some embodiments of systems and devices herein are described below.

The term "assistive listening device" as used herein shall refer to devices that can aid a person with hearing, especially in particular environments such as particular sound fields. The term "assistive listening device" shall include devices that can produce optimized or processed sound for persons with abnormal and/or normal hearing. Assistive listening devices herein can include hearables (e.g., wearable earphones, wearable speakers, personal speakers, headphones, earbuds, virtual reality headsets), hearing aids (e.g., hearing instruments), cochlear implants, and bone-conduction devices, for example. Assistive listening devices include, but are not limited to, behind-the-ear (BTE), in-the ear (ITE), in-the-canal (ITC), invisible-in-canal (IIC), receiver-in-canal (RIC), receiver in-the-ear (RITE) or completely-in-the-canal (CIC) type assistive listening devices or some combination of the above. In some embodiments herein, an assistive listening device may also take the form of a piece of jewelry, including the frames of glasses, that may be worn on the head on or about the ear.

Referring now to FIG. 1, a schematic view is shown of an assistive listening device wearer 100 with an audio provisioning device 104 in a sound field 110 in accordance with various embodiments herein. The sound field 110 can include an audio source 106 emitting sound waves 108. The sound waves 108 can be picked up by a microphone 114 in electronic communication with the audio provisioning device 104. In some embodiments, the microphone 114 can be integrated into the audio provisioning device 104, but in other embodiments the microphone can be separate. In some embodiments, the audio source 106 can be in communication with the audio provisioning device 104 (either a direct wired connection as shown or a wireless connection). An audio provisioning device 104 can provide a signal or stream that is received by an assistive listening device 102 to provide the audio to the assistive listening device wearer 100. By way of example, the audio provisioning device 104 (or a device working in concert therewith) can provide an audio stream to the listening device wearer 100 that satisfying their listening or device needs based on their hearing abilities, the type of device they are using, their language needs, and the like. The audio provisioning device 104 can function as a single device or it can operate in concert with other devices including, but not limited to, transmitters, servers, audio communication devices, credential verification devices, and the like.

In some cases, the audio provisioning device 104 can emit a signal advertising (or advertisement signal) to all assistive listening devices requesting that all assistive listening devices receiving the signal reply back with a responsive signal. In various embodiments, the assistive listening device can be configured to issue the advertisement signal. In various embodiments, the assistive listening device can be configured to issue the advertisement signal (or other communications) periodically, randomly, upon detection of the assistive listening device entering a sound field, or under other circumstances.

After receipt of a signal from an assistive listening device, the audio provisioning device 104 can further send a request to responsive devices to transmit one or more of their identification credentials, device requirements, device wearer requirements, authorization credentials, and the like. The audio provisioning device 104 then can perform operations to determine how many audio streams are required in order to service the assistive listening devices that are present. The audio provisioning device 104 can then provide (directly or through another device) audio streams to the assistive listening devices that are present. In some cases, however, the process may start not with the audio provisioning device 104, but with the assistive listening devices.

For example, the process may start with an initial transmission, such as an advertisement signal, from the assistive listening devices. Many different protocol options are contemplated herein for the initiation and maintenance of data transmission between audio provisioning devices and listening assistance devices.

In some embodiments, a beacon or broadcast advertisement coming from the assistive listening device wearer (such as from an object they carry or wear other than the assistive listening device itself) can be used to convey all the necessary information such as language preference, hearing loss characteristics, user preferences/requirements, device requirements, etc. In specific, this information can be conveyed to the assistive listening device which can then, in turn, convey it on to the audio provisioning device or this information can be conveyed directly to the audio provisioning device bypassing the assistive listening device entirely.

In some embodiments, an assistive listening device is configured to issue a communication in response to a query received from an audio communication device or audio provisioning device. In some embodiments, an assistive listening device is configured to issue a communication upon detection of the assistive listening device entering an entry zone. In some embodiments, an assistive listening is configured to issue a communication upon detection of the assistive listening device passing an entry point or a threshold. In some embodiments, an assistive listening device is configured to issue a communication upon detection of the assistive listening device crossing a particular geofence. In some embodiments, an assistive listening device is configured to issue a communication upon detection of the assistive listening device reaching a certain proximity to a beacon, such as within 1, 2, 5, 10, 15, 25, 30, 40 or 50 meters or a distance falling within a range between any of the foregoing. In some embodiments, an assistive listening device is configured to issue a communication upon detection of the assistive listening device upon an off-band electromagnetic signal level crossing a threshold. In some embodiments, an assistive listening device is configured to issue the communication at fixed or random intervals. In some embodiments, an assistive listening device is configured to issue the communication at a predetermined time. In various embodiments, the issued communication includes at least two of a language preference specific to a wearer of the assistive listening device, a set of hearing requirements specific to a wearer of the assistive listening device, data regarding a presentation delay specific to the assistive listening device, an authorization status, code or key specific to a wearer of the assistive listening device.

It will be appreciated that, in some cases, groups of assistive listening device wearers may have common needs with regard to the audio provided to them with the assistance of an assistive listening device. This insight can allow for more efficient provisioning of audio streams in view of limited wireless bandwidth, the amount of equipment available within a given sound field, and/or the potential expense and/or processing resources devoted to generating specific audio streams.

Figure 2:
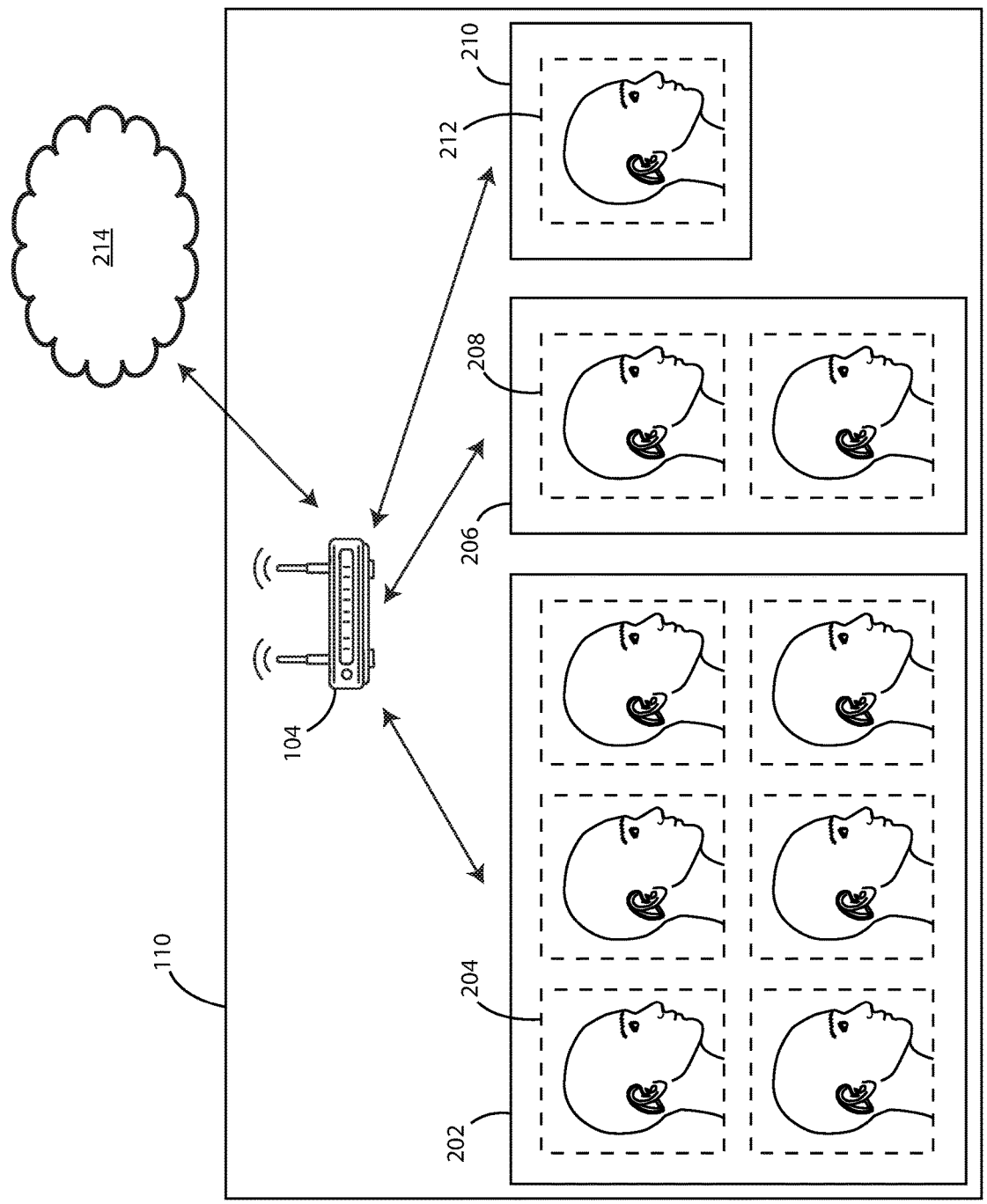
FIG. 2 is a schematic view of groups of assistive listening device wearers with an audio provisioning device in a sound field in accordance with various embodiments herein.

Referring now to FIG. 2, a schematic view is shown of groups of assistive listening device wearers with an audio provisioning device 104 in a sound field 110 in accordance with various embodiments herein. In this case, a first group 202 of assistive device wearers 204 may share a particular listening need, such as a translation to a common foreign language. This group 202 can receive a common audio stream from an audio provisioning device 104. A second group 206 of assistive device wearers 208 may share a different device need, such as an audio stream that will work properly with a specific type or class of assistive listening device. A third group 210 of assistive device wearers 212 may have yet a different listening or device need.

In some cases, assistive listening devices can proactively transmit their requirements to the audio provisioning device 104. However, in other embodiments, assistive listening devices can be polled by the audio provisioning device 104 for their requirements. Notably, when there is no group with a specific requirement, for example no group requires a language translation into a particular language, then the audio provisioning device 104 can omit transmitting (or causing to be transmitted) an audio stream in the unneeded language. In this manner, wireless bandwidth can be conserved, and processing efficiency can be increased.

It will be appreciated that at some point, depending on the specific number of groups, the available wireless bandwidth may be fully utilized. However, in accordance with various embodiments herein, the audio provisioning device 104 automatically can change the bandwidth utilized by one or more existing audio steams in order to reduce the amount of bandwidth they are consuming and therefore accommodate additional new audio streams. For example, in some embodiments, a codec used to compress audio stream data can be implemented and/or changed to one having a higher level of compression in order to free up wireless bandwidth space. In some cases, the audio provisioning device 104 (and/or a separate device working in concert therewith) can store information in order to be able to compress data using any of several codecs, and the audio provisioning device 104 can select an appropriate codec for use based on factors such as which codecs can be used by particular assistive listening devices or groups of assistive listening devices, the degree of compression the codec offers, the processing bandwidth consumed by use of the codec, the audio quality provided by the codec, and the like. In some embodiments, codecs can be switched depending (at least in part) on the nature of the audio content (e.g., speech vs. multimedia vs. music, etc.). In some embodiments, preferences of a device wearer regarding codecs can be sent to an audio provisioning device or other device in order to facilitate codec switching according to preferences of the device wearer.

In some cases, one or more audio streams may be prioritized by the audio provisioning device 104. For example, in a scenario where available wireless bandwidth is not sufficient to provide streams in accordance with requirement/preferences of every hearing assistance device and/or every group of hearing assistance devices, then certain audio streams must be omitted from the set that is broadcast. In some cases, this type of prioritization can be made on the basis of the numbers of devices in each group (e.g., number of devices with shared requirements/preferences). Thus, if the total set of audio streams requested would consume an amount of wireless bandwidth that is greater than what is available (or what has been allocated) then those streams serving the fewest numbers of devices (and, therefore, wearers) can be omitted if not yet started or even canceled if already being broadcast. In other cases, the prioritization can be done differently. For example, a particular hearing assistance device and/or the wearer or a particular group may have a high-priority status which would ensure that an audio stream matching their requirements/preferences must be broadcast. In some cases, the prioritization can be selected and input into the system by someone with administrative access in order to comply with venue specific requirements. For example, perhaps a specific venue wants to ensure that a particular language will be available. In such a case, the particular language can be prioritized to ensure that it will be broadcast.

In various embodiments, the assistive listening device and/or the audio provisioning device can automatically direct the assistive listening device wearer to an appropriate stream (based on various factors including advertised preferences, requirements, etc.), such as by providing credentials to access that specific stream.

Figure 3:
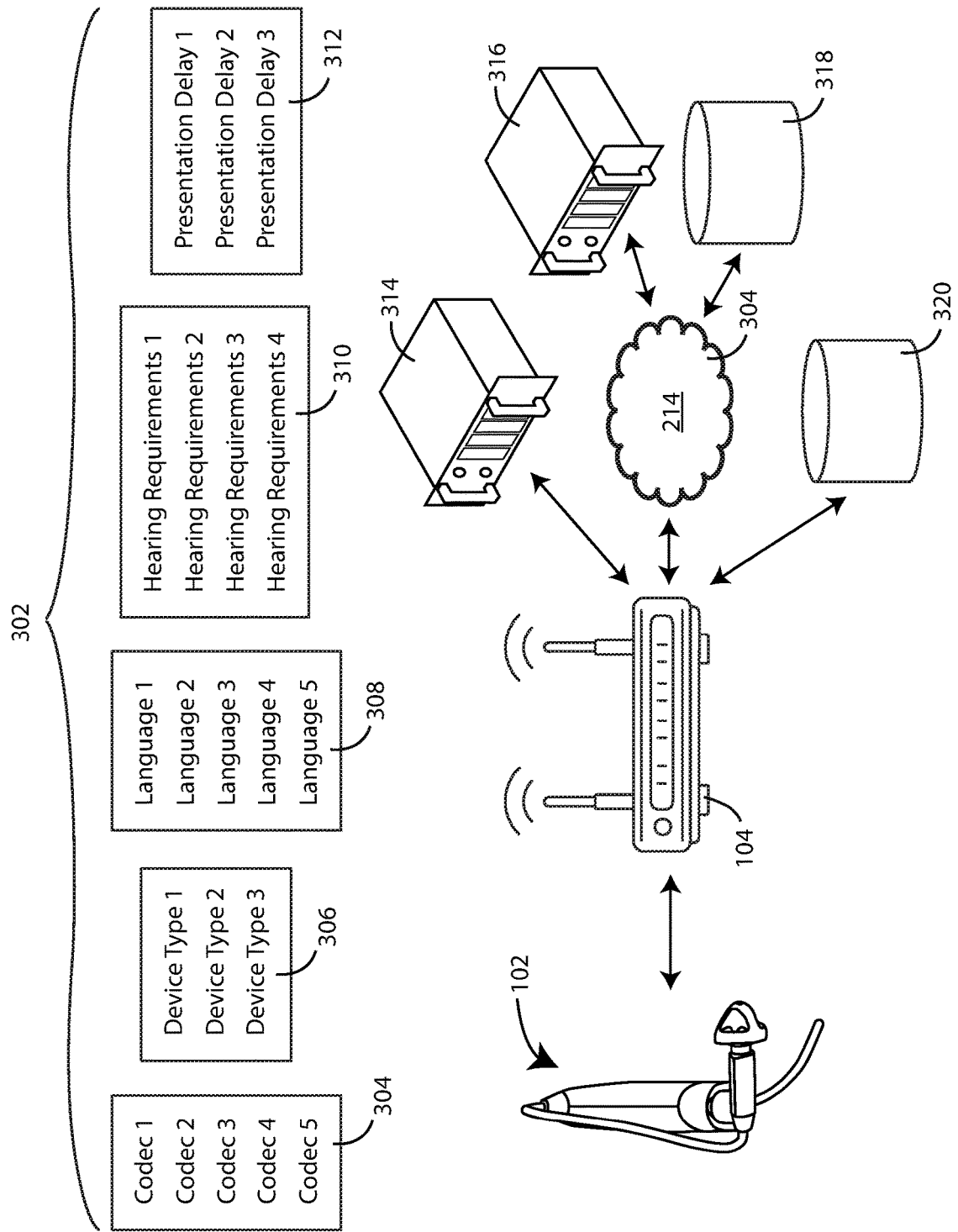
FIG. 3 is a schematic view of an assistive listening device interfacing with an audio provisioning device in accordance with various embodiments herein.

Referring now to FIG. 3, a schematic view is shown of an assistive listening device 102 interfacing with an audio provisioning device 104 in accordance with various embodiments herein. The assistive listening device 102 can communicate with the audio provisioning device 104 wirelessly. Many different wireless data transmission protocols can be used including, but not limited to, 900 MHz communications, 2.4 GHz communications, communications at another frequency, FM, AM, SSB, BLUETOOTH®, Low Energy BLUETOOTH®, Long Range BLUETOOTH®, IEEE 802.11 (wireless LANs) wi-fi, 802.15 (WPANs), 802.16 (WiMAX), 802.20, and cellular protocols including, but not limited to CDMA and GSM, ZigBee, and ultra-wideband (UWB) technologies.

In various embodiments, the audio provisioning device 104 (or a separate device working in concert therewith) can select and/or provide an appropriate audio stream to the assistive listening device 102. The appropriate audio stream can take into account various listening and/or device needs associated with the assistive listening device 102 or the listening device wearer. The appropriate audio stream can also take into account bandwidth limitations as well as processing limitations. Taken together, the various requirements and options can be referred to as audio stream configuration parameters 302.

Exemplary audio stream configuration parameters 302 can include, but are not limited to, codecs 304, device types 306 or device classes, language requirements 308, hearing requirements 310 associated with the device wearer, and presentation delays 312 associated with the device, sound field, audio content or the like. Other types of audio stream configuration parameters 302 are also contemplated herein.

In various embodiments, in response to a receipt of an audio stream herein or a notification regarding the same, assistive listening devices herein can activate an auto-vent feature that actively closes off a vent of the assistive listening device to provide greater acoustic separation between what is be played in the ear canal from the ambient sounds external to the ear coupling. The vent feature also has other advantages that would be desirable when listening to a direct audio stream. Examples of vent features include, but are not limited to, those found in commonly-owned U.S. patent application Ser. No. 13/720,793 (now issued as U.S. Pat. No. 8,923,543), entitled HEARING ASSISTANCE DEVICE VENT VALVE, and commonly-owned U.S. Provisional Patent Application No. 62/850,805, entitled SOLENOID ACTUATOR IN A HEARING DEVICE, both of which are hereby incorporated by reference herein in their entirety. In some embodiments, a vent feature of a hearing assistance device may be activated responsive to a presentation delay for the hearing assistance device crossing a threshold. In some embodiments, the threshold by which a vent feature is activated is based upon hearing requirements 310 of the user. For example, individuals with normal hearing sensitivity are especially susceptible to perceiving presentation delays; therefore, a user with normal hearing may benefit from a vent feature being activated when a presentation delay is e.g., greater than 10 milliseconds whereas a user with severe hearing impairment may not perceive significant direct and amplified path interference until e.g., 80 milliseconds. As such, the threshold can vary and can be about 6, 8, 10, 12, 15, 20, 25, 30, 35, 40, 45, 50, 60, 70, 80, 90, or 100 milliseconds or more, or an amount of time falling within a range between any of the foregoing.

In some embodiments, the system can determine a wearer's position within a sound field (such as by using sensor described in greater detail below) in order to prevent audio echoes as well with acoustic audio input depending on a wearer's location with respect to the source of the acoustic audio, which can be used to provide adjustments to the wireless audio presentation delay for the wearer to prevent unwanted echoes between acoustic audio and audio received wirelessly. In some embodiments, the assistive listening device and system may utilize the determined location and head position of the user to apply a location-dependent HRTF (head-related transfer function) filter to the audio stream played back to the assistive listening device wearer. The data regarding the location and/or tracking of the hearing device can also be applied by the assistive listening device based upon known or monitored impulse room responses.

In some embodiments, audio stream configuration parameters herein can also include aspects related to the distance over which the audio stream must be conveyed. By way of example, one or more of the streams may be modified to handle long range communication based on a wearer's proximity to an audio provisioning device and/or broadcast transmitter. For example, a wearer located at a greater distance from the audio provisioning device or transmitter may receive an audio stream capable of a higher link margin. Techniques such as increasing wireless signal power, coded modulation, and/or baseband coding can be used for the purpose of improving link margin for wearers located further from the broadcasting device (which could be an audio provisioning device or a broadcast transmitter associated therewith).

In some embodiments, an assistive listening device 102 may interface with the audio provisioning device 104 using a first communication protocol, and then receive an audio stream from the audio provisioning device 104 using a second communication protocol. In at least one example, an assistive listening device 102 may communicate a set of audio stream configuration parameters 302 to the audio provisioning device 104, and then receive an audio stream from the audio provisioning device 104 that is delivered through one or more of an assistive listening system, an induction hearing loop, an infrared-based assistive listening system, an FM-based assistive listening system, or the like, that is operatively connected to the audio provisioning device 104 for the purpose of audio content selection or generation.

The audio provisioning device 104 can be in communication with a local server 314. In some cases, the audio provisioning device 104 can offload processing tasks to the local server, such as real time translation operations when required. The audio provisioning device 104 can also be in communication with a remote server 316 in the cloud 214. In various embodiments herein, the audio provisioning device 104 can execute processing operations to generate audio streams itself. However, in other embodiments, it may offload processing tasks onto a local server 314 or a remote server 316 in the cloud 214 (a real server or a virtualized one). For example, in some contexts, real time translation into a particular language can be performed by the audio provisioning device 104, a local server 314, a remote server 316, or can be obtained through an API or other interface from a third-party computing resource.

In some embodiments, audio data and/or prerecorded audio files for repeated content (such as a movie, or the like) can be stored. Thus, if the audio provisioning device 104 determines that one or more listening assistance devices require the audio of the movie (or other repeated content) to be translated into a particular language, the audio provisioning device 104 can first query the database to see if a prerecorded translation exists for the specific language needed and use the stored translation as the basis for an audio stream to be transmitted to one or more listening assistance devices that require that particular language. In this matter, the audio provisioning device 104, or another component of the system, can check to see if the required audio stream is already available as an audio file (locally or remotely) to obtain and stream before committing the processing resources necessary to create a particular audio stream in real time. In some examples, it may be more desirable, from an artistic standpoint, to stream a pre-recorded audio file rather than to generate a real time translation. Since the audio provisioning device will frequently be tasked with obtaining multiple different audio streams simultaneously, in some embodiments, the provisioning device (or another device in communication therewith) can generate (or cause to be generated) one or more audio streams while one or more other audio streams can simply be obtained from memory or a local database 320 or a remote database 318.

In some cases, one or both of the local database 320 and the remote database 318 can store records of which listening assistance devices are authorized in particular sound fields. In some cases, one or both of the local database 320 and the remote database 318 can store records of particular requirements associated with certain types of listening assistance devices.

Figure 4:
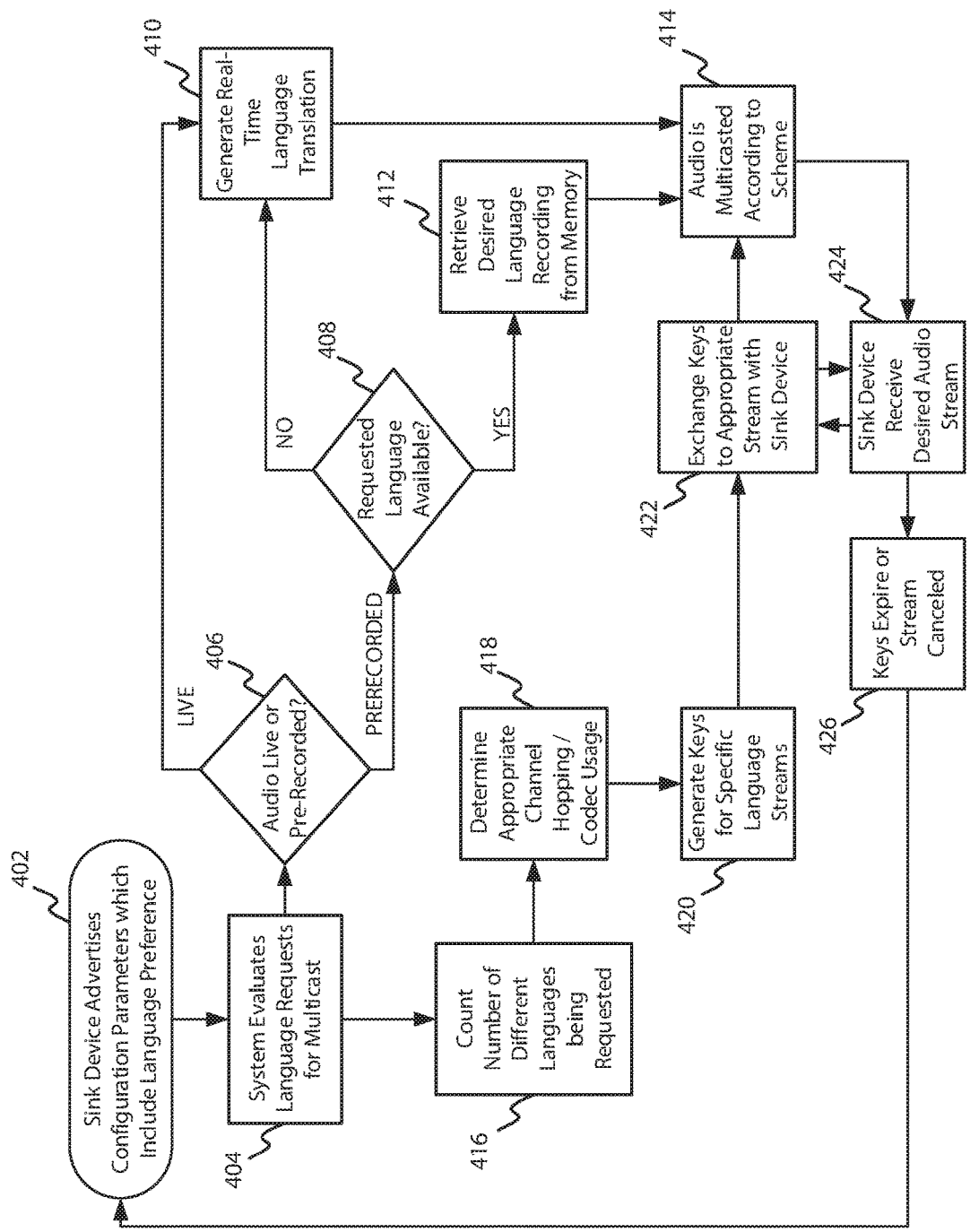
FIG. 4 is a flowchart of an assistive listening device interfacing with an audio provisioning device to obtain a desired audio stream in accordance with various embodiments herein.

Referring now to FIG. 4, a flowchart is shown of an assistive listening device (or sink device) interfacing with an audio provisioning device to obtain a desired audio stream in accordance with various embodiments herein. In a first operation, the sink device advertises 402 configuration parameters which can include a language preference/request, amongst other things. In a second operation, a component of the system (such as the audio provisioning device 104) can evaluate 404 language requests. Further, in a third operation, a component of the system can determine 406 whether the audio for which a language is requested is live or pre-recorded. If it is live, then in a fifth operation a real-time language translation can be created 410. However, if it is prerecorded, then in a sixth operation a component of the system can determine if the requested language is available 408. If not, then a real-time language translation can be created 410. If the requested language is available in a pre-recorded format, then a component of the system can retrieve 412 the desired language recording file/data from memory.

Simultaneously, after the operation of a component of the system evaluating 404 language requests, a component of the system can count 416 the number of different languages being requested. Based on the total number, the system can determine 418 various parameters for multicasting audio streaming including one or more of determining an appropriate channel hopping scheme and selection of appropriate codecs to optimize sound quality while accommodating as many different audio streams as is necessary. In some embodiments, a component of the system can generate 420 keys for specific language audio streams. In some embodiments, a component of the system can exchange 422 keys (such as digital keys, including but not limited to cryptographic keys) for an appropriate audio stream/broadcast with the sink device.

Regardless of how it is obtained, then the audio stream(s) can be multicasted 414. The sink device can receive 424 the desired audio stream. In some embodiments, a time may come where the keys expire or an audio stream being received by a particular sink device is canceled 426. In various embodiments, the sink device can proceed back to an initial step of advertising 402 configuration parameters.

Various approaches can be used to ensure that a particular assistive listening device 102 (or sink device) receives the appropriate audio stream. In addition, various approaches can be used to ensure that a particular assistive listening device 102 only receives audio streams that it is authorized to receive. For example, a given environment may contain multiple sound fields and it may be desirable to limit the audio streams that a particular wearer can receive to only those audio streams associated with the particular sound field they are authorized to be in. For example, at a movie theater, it may be desirable to limit the audio stream that a wearer can receive to those associated with the correct theater for their movie or other entertainment. As another example, it may be desirable to limit the audio stream that a wearer can receive to only those meeting a specific content rating requirement. For example, in the context of a movie theater a child may receive a censored version of the audio stream, while an adult may be permitted to receive the explicit version of the audio stream. As yet another example, in the context of a sporting event, it may be desirable to provide a specific audio stream to only a particular section or only to fans of a specific team.

Figure 5:
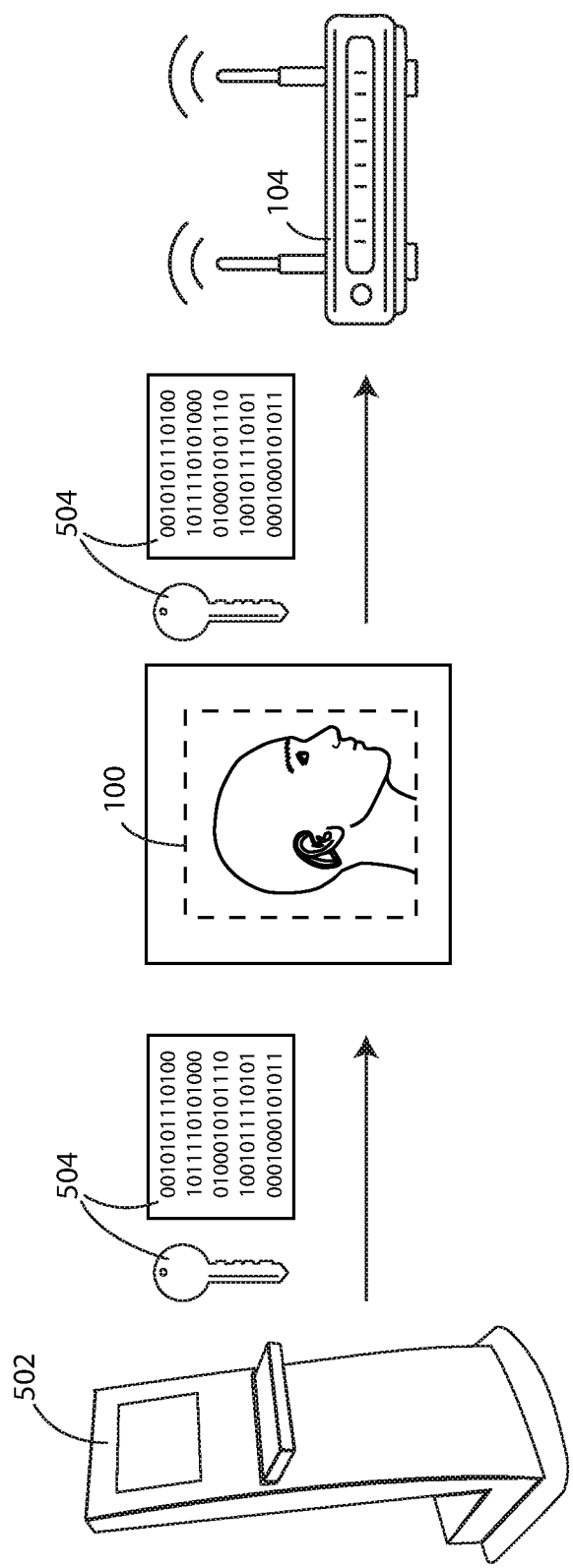
FIG. 5 is a schematic view of an assistive listening device wearer obtaining a key or authorization and then interfacing with an audio provisioning device in accordance with various embodiments herein.

Referring now to FIG. 5, a schematic view is shown of an assistive listening device wearer obtaining a digital key (or authorization status identifier, code, token or the like) and then interfacing with an audio provisioning device in accordance with various embodiments herein. In some embodiments, the assistive listening device wearer 100 may interface with a system 502 (autonomous or operated by a human operator) in order to obtain a digital key 504 (or authorization status identifier, code, token, or the like). In some cases, specific information about the listening needs or device needs associated with the assistive listening device or the listening device wearer can be included as part of the digital key 504. In some cases, specific information about the particular content that the assistive listening device is entitled to receive can be included as part of the digital key 504. In some embodiments, the system 502 can be completely autonomous and can include capabilities to receive and/or process payment based on a credit card, a wireless digital payment system, or the like. In other embodiments, the system 502 may be operated by a commercial agent (such as a counter attendant, cashier, ticket agent, or the like).

The assistive listening device wearer 100 and/or the assistive device they are wearing may then pass the digital key 504 to an audio provisioning device 104 (or another device working in concert therewith) in order to evaluate the digital key 504 to determine one or more aspects including whether or not it is genuine and the specific information it carries such as specific information about the listening needs or device needs associated with the assistive listening device or the listening device wearer and/or the content which the same the device or wearer is authorized to receive. In some cases, the audio provisioning device 104 can verify a digital signature associated with the digital key 504 using a public key of the agent/device issuing the digital key 504. After verification and/or receiving information regarding the listening needs or device needs associated with the assistive listening device or the listening device wearer and/or the content which the same device or wearer is authorized to receive then the audio provisioning device 104 can commence transmitting an audio stream for the specific assistive listening device or listening device wearer, or a group for which they belong, or provide credentials to the specific assistive listening device so that it can receive and process an appropriate audio stream that is already being transmitted within the sound field.

Figure 6:
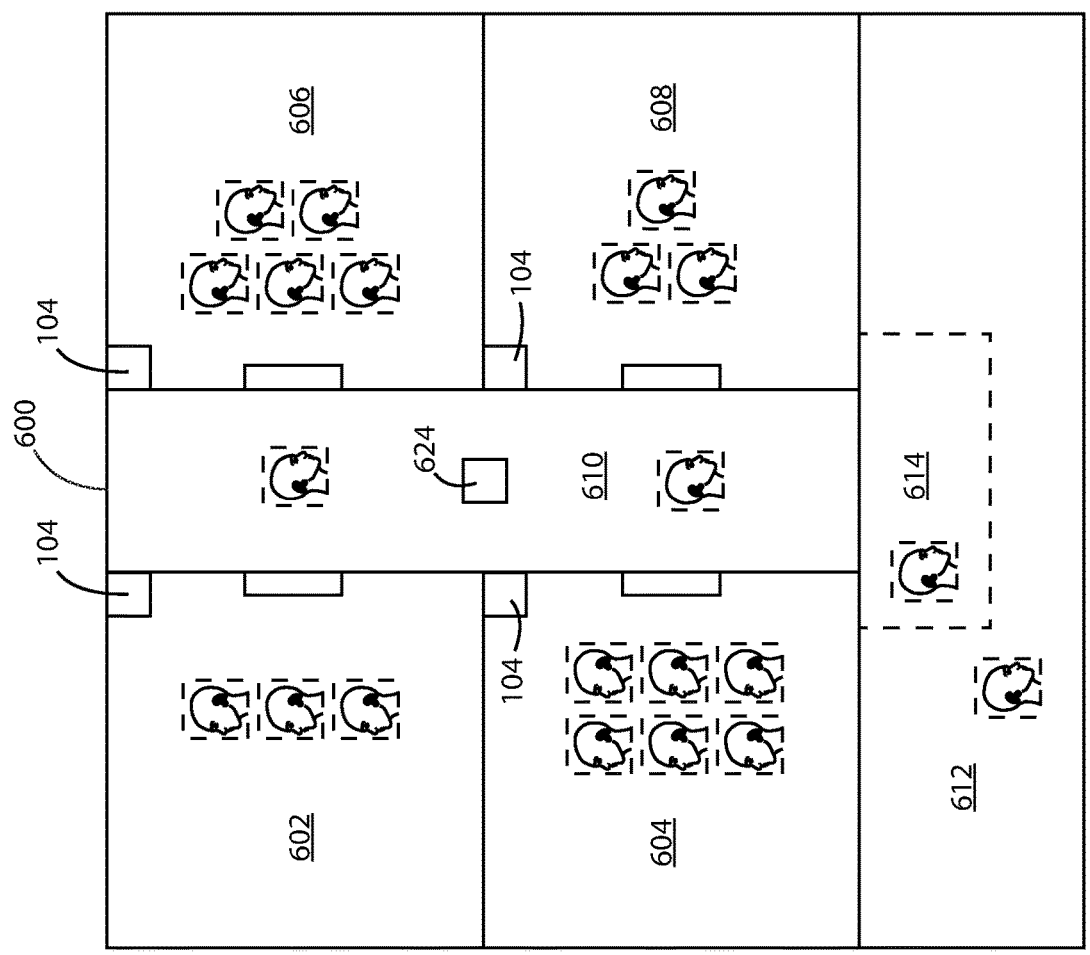
FIG. 6 is a schematic view of an environment with multiple sound fields in accordance with various embodiments herein.

As described above, in various scenarios the environment may include multiple sound fields. Referring now to FIG. 6, a schematic view is shown of an environment 600 with multiple sound fields in accordance with various embodiments herein. In this example, the environment 600 includes a first sound field 602, a second sound field 604, a third sound field 606, and a fourth sound field 608, although it will be appreciated that the number of sounds fields within a particular environment is not so limited. In some embodiments, each sound field may include a geofence around the perimeter of the sound field. In this manner, the assistive listening device can remain in a mode where it is not receiving and playing an audio stream when the assistive listening device is outside of the particular sound field or geofence, such as in a common hallway 610. In some embodiments, a geofence around the perimeter of the sound field may be marked by a magnetic field or could include an induction hearing loop.

In some embodiments, the wearer of the assistive listening device can first enter a lobby 612 and can then move to an entry zone 614. In various embodiments, the assistive listening device can obtain credentials such as a digital key in the lobby 612 or the entry zone 614. In various embodiments, the assistive listening device can obtain credentials through a web-based system before even arriving at the environment containing the sound fields. From the entry zone 614, the assistive listening device wearer can then move through a common hallway 610 that may be between the distinct sound fields.

In some embodiments, each sound field can include its own audio provisioning device 104. In other embodiments, an environment 600 including multiple sound fields can include a multi-zone audio provisioning device 624.

In various embodiments, the assistive listening device wearer can be guided to the particular sound field (or fields) for which they are authorized. In various embodiments, the assistive listening device wearer can be guided away from the particular sound field (or fields) for which they are not authorized. Examples of guidance techniques are described in greater detail below.

Sound fields can include many different scenarios, including, but not limited to, a theater, a classroom, a gathering hall, a conference room, a vehicle, an area around a kiosk, a reception desk area (e.g., cashier, pharmacy counter, bank teller, etc.), an exhibit area, or a mobile tour group area.

Assistive listening devices, including but not limited to hearing aids and hearables (e.g., wearable earphones), can include an enclosure, such as a housing or shell, within which internal components are disposed. Components of an assistive listening device herein can include one or more of a control circuit, digital signal processor (DSP), memory (such as non-volatile memory), power management circuitry, a data communications bus, one or more communication devices (e.g., a radio, a near-field magnetic induction device), one or more antennas, one or more microphones, a receiver/speaker, and various sensors as described in greater detail below. More advanced assistive listening devices can incorporate a long-range communication device, such as a BLUETOOTH® transceiver or other type of radio frequency (RF) transceiver.

In some embodiments, the assistive listening device can gather ambient sound data with the microphone, process the ambient sound data to obtain an ambient sound input stream, mix the ambient sound input stream and the audio stream into a combined sound stream, and then convert the combined sound stream into sound using the electroacoustic transducer.

Figure 7:
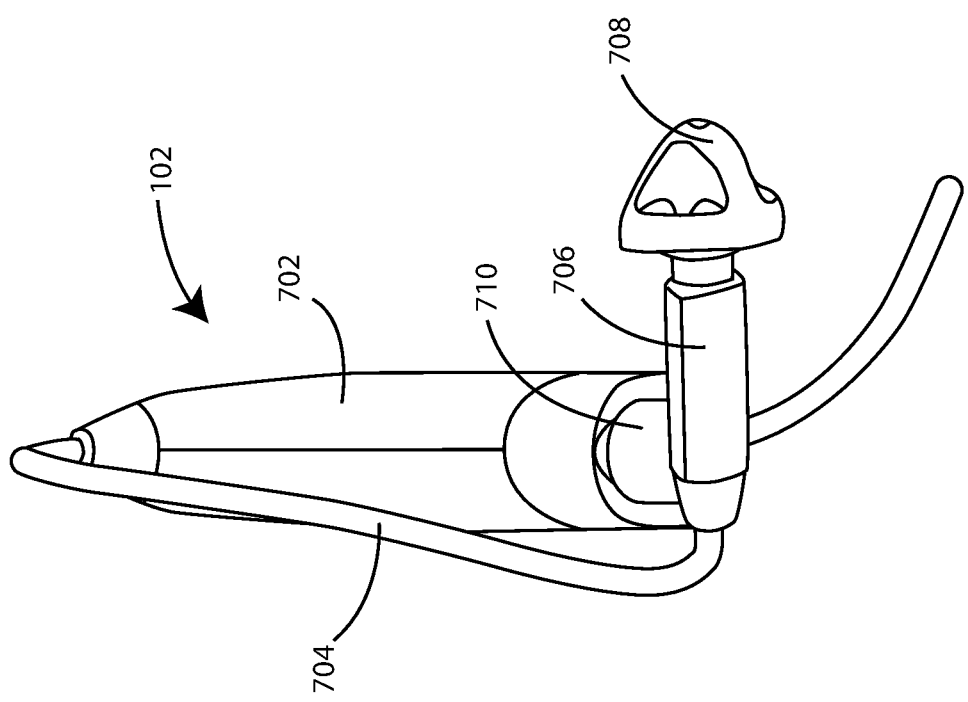
FIG. 7 is a schematic view of an assistive listening device in accordance with various embodiments herein.

Referring now to FIG. 7, a schematic view of an assistive listening device 102 is shown in accordance with various embodiments herein. The assistive listening device 102 can include an assistive listening device housing 702. The assistive listening device housing 702 can define a battery compartment 710 into which a battery can be disposed to provide power to the device. The assistive listening device 102 can also include a receiver 706 adjacent to an earbud 708. The receiver 706 an include a component that converts electrical impulses into sound, such as an electroacoustic transducer, speaker, or loud speaker. A cable 704 or connecting wire can include one or more electrical conductors and provide electrical communication between components inside of the assistive listening device housing 702 and components inside of the receiver 706. It will be appreciated, however, that the assistive listening device 102 shown in FIG. 7 is merely one example and that other examples of assistive listening devices can include a greater or lesser number of components.

The assistive listening device 102 shown in FIG. 7 is a receiver-in-canal type device and thus the receiver is designed to be placed within the ear canal. However, it will be appreciated that may different form factors for assistive listening devices are contemplated herein. As such, assistive listening devices herein can include, but are not limited to, behind-the-ear (BTE), in-the ear (ITE), in-the-canal (ITC), invisible-in-canal (ITC), receiver-in-canal (RIC), receiver in-the-ear (RITE) and completely-in-the-canal (CIC) type assistive listening devices. Aspects of assistive listening devices and functions thereof are described in U.S. Pat. No. 9,848,273; U.S. Publ. Pat. Appl. No. 20180317837; and U.S. Publ. Pat. Appl. No. 20180343527, the content of all of which is herein incorporated by reference in their entirety.

Assistive listening devices of the present disclosure can incorporate an antenna arrangement coupled to a high-frequency radio, such as a 2.4 GHz radio. The radio can conform to an IEEE 802.11 (e.g., WIFI®) or BLUETOOTH® (e.g., BLE, BLUETOOTH® 4.2 or 5.0, and BLUETOOTH® Long Range) specification, for example. It is understood that assistive listening devices of the present disclosure can employ other radios, such as a 900 MHz radio. It is also understood that assistive listening devices of the present disclosure can employ one or more magnetic sensors (e.g., TMR, GMR, telecoil, and the like) and a telecoil. Assistive listening devices of the present disclosure can be configured to receive streaming audio (e.g., digital audio data or files) from an electronic, electromagnetic, optical, or digital source. Assistive listening devices herein can also be configured to switch communication schemes to a long-range mode of operation, wherein, for example, one or more signal power outputs may be increased and data packet transmissions may be slowed or repeated to allow communication to occur over longer distances than that during typical modes of operation. In some embodiments, a higher link margin can be achieved through various techniques including, but not limited to, increasing wireless signal power, coded modulation, and/or baseband coding. Representative electronic/digital sources (also serving as examples of accessory devices herein) include an assistive listening system, a TV streamer, a radio, a smartphone, a cell phone/entertainment device (CPED), a phone streaming device, a telecoil receiver device, a pendant, wrist-worn device, a remote microphone, a remote control, a hearing instrument programming device, or other electronic device that serves as a source of digital audio data or files.

Figure 8:
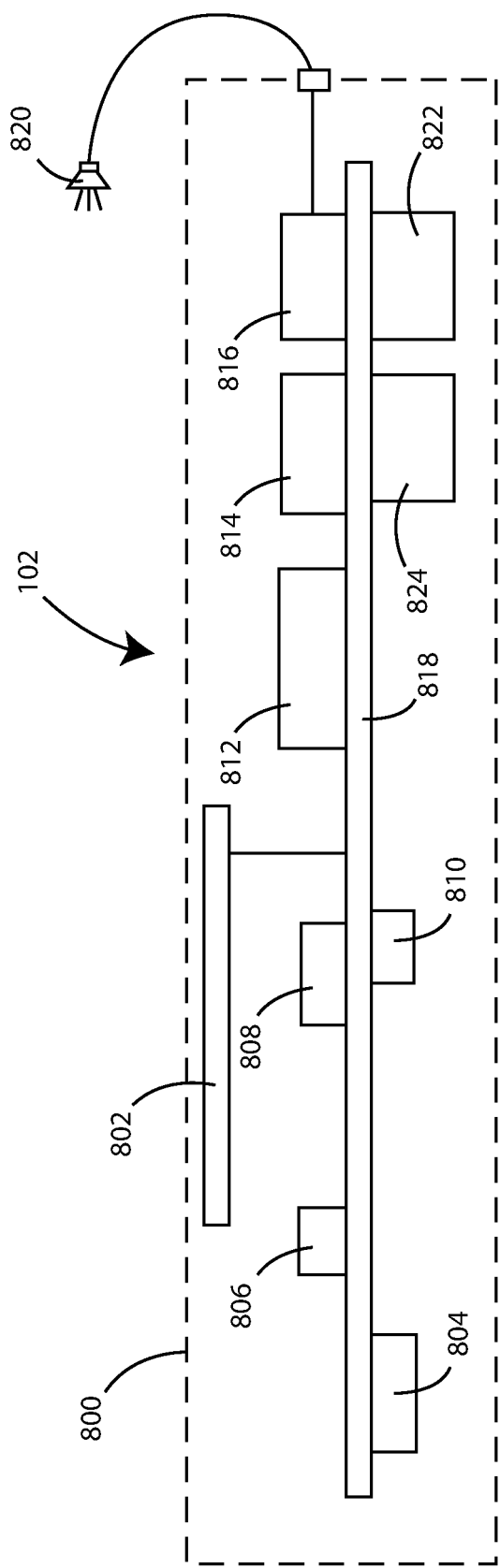
FIG. 8 is a schematic view of components of an assistive listening device in accordance with various embodiments herein.

Referring now to FIG. 8, a schematic block diagram is shown with various components of an assistive listening device in accordance with various embodiments. The block diagram of FIG. 8 represents a generic assistive listening device for purposes of illustration. It will be appreciated, that assistive listening devices herein can include a greater or lesser number of components than that shown in FIG. 8. The assistive listening device 102 shown in FIG. 8 includes several components electrically connected to a flexible mother circuit 818 (e.g., flexible mother board) which is disposed within housing 800. A power supply circuit 804 can include a battery and can be electrically connected to the flexible mother circuit 818 and provides power to the various components of the assistive listening device 102. In some examples, the power supply circuit 804 can include power supply that is different than a battery and which is electrically connected to the flexible mother circuit 818 and provides power to the various components of the assistive listening device 102. One or more microphones 806 are operatively connected to the flexible mother circuit 818, which provides electrical communication between the microphones 806 and a digital signal processor (DSP) 812. Among other components, the DSP 812 incorporates or is coupled to audio signal processing circuitry configured to implement various functions described herein. A sensor package 814 can be coupled to the DSP 812 via the flexible mother circuit 818. The sensor package 814 can include one or more different specific types of sensors such as those described in greater detail below. One or more user switches 810 (e.g., on/off, volume, mic directional settings) can be operatively coupled to the DSP 812 via the flexible mother circuit 818.

An audio output device 816 is operatively connected to the DSP 812 via the flexible mother circuit 818. In some embodiments, the audio output device 816 comprises a speaker (coupled to an amplifier). In other embodiments, the audio output device 816 comprises an amplifier coupled to an external receiver 820 adapted for positioning within an ear of a wearer. The external receiver 820 can include an electroacoustic transducer, speaker, or loud speaker. The assistive listening device 102 may incorporate a communication device 808 coupled to the flexible mother circuit 818 and to an antenna 802 directly or indirectly via the flexible mother circuit 818. The communication device 808 can be a BLUETOOTH® transceiver, such as a BLE (BLUETOOTH® low energy) transceiver or other transceiver (e.g., an IEEE 802.11 compliant device). The communication device 808 can be configured to communicate with one or more external devices, such as those discussed previously, in accordance with various embodiments. In various embodiments, the communication device 808 can be configured to communicate with an external visual display device such as a smartphone, a video display screen, a tablet, a computer, a display projector, a virtual reality display, an augmented reality display, or the like.

In various embodiments, the assistive listening device 102 can also include a control circuit 822 and a memory storage device 824. The control circuit 822 can be in electrical communication with other components of the device. The control circuit 822 can execute various operations, such as those described herein. The control circuit 822 can include various components including, but not limited to, a microprocessor, a microcontroller, an FPGA (field-programmable gate array) processing device, an ASIC (application specific integrated circuit), or the like. The memory storage device 824 can include both volatile and non-volatile memory. The memory storage device 824 can include ROM, RAM, flash memory, EEPROM, SSD devices, NAND chips, and the like. The memory storage device 824 can be used to store data from sensors as described herein and/or processed data generated using data from sensors as described herein.

Figure 9:
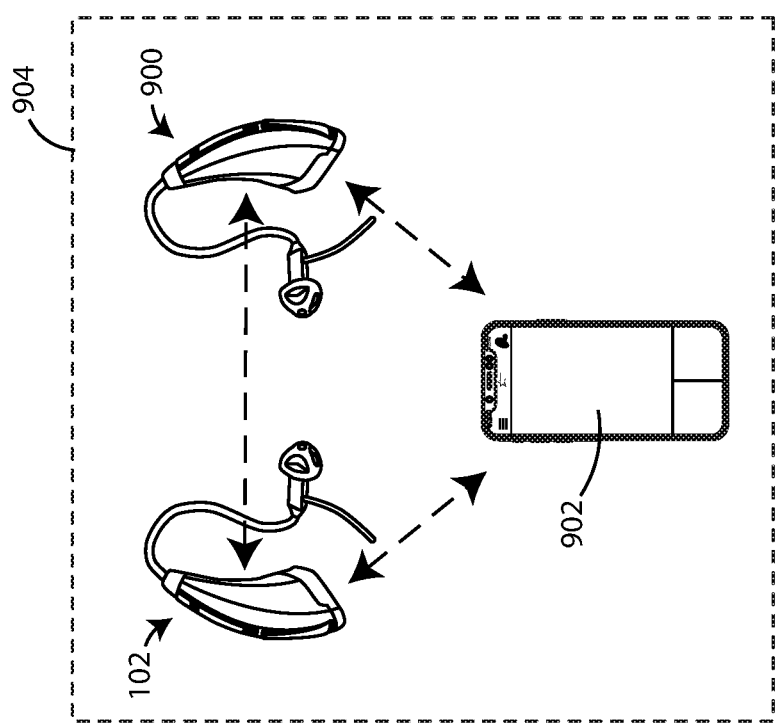
FIG. 9 is a schematic view of assistive listening devices and an accessory device in accordance with various embodiments herein.

Assistive listening devices/systems herein can include more than one physical component. It will be appreciated that data and/or signals can be exchanged between many different components in accordance with embodiments herein. Referring now to FIG. 9, a schematic view is shown of data and/or signal flow as part of a system in accordance with various embodiments herein. In a device wearer (not shown) can have a first assistive listening device 102 and a second assistive listening device 900 both within an environment 904. The assistive listening devices 102, 900 and associated hardware therein can be disposed on opposing lateral sides of the subject's head. In various embodiments, data and/or signals can be exchanged directly between the first assistive listening device 102 and the second assistive listening device 900. Data and/or signals can be exchanged wirelessly using various techniques including inductive techniques (such as near-field magnetic induction—NFMI), 900 MHz communications, 2.4 GHz communications, communications at another frequency, FM, AM, SSB, BLUETOOTH®, Low Energy BLUETOOTH®, Long Range BLUETOOTH®, IEEE 802.11 (wireless LANs) WIFI, 802.15 (WPANs), 802.16 (WiMAX), 802.20, and cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

Various accessory devices 902 can also be used in combination with assistive listening devices herein and/or can form a part of an assistive listening device system. For example, an accessory device 902 such as a smartphone, smartwatch, monitoring device, internet gateway, hearing aid accessory, captioning device, tactile display device, or the like, can also be included as part of an assistive listening device system. The accessory device 902 can exchange data and/or signals with one or both of the first assistive listening device 102 and the second assistive listening device 900 and/or with an accessory to the assistive listening devices (e.g., a remote microphone, a remote control, a phone streamer, a TV streamer, a telecoil receiver, a hearing instrument programming device, captioning device, tactile display, etc.). In some embodiments, the accessory device 902 can receive signals from and/or send signals to an audio provisioning device 104.

According to some embodiments, various hearing assistance device operations or states can trigger one or more events involving the hearing assistance device and/or an accessory that interacts with the hearing device. For example, receiving configuration parameters, initiating reception of a selected audio program, receiving a link key, and/or terminating a link key can trigger one or more events involving the hearing device and/or the accessory device. For example, a signal can be sent to the accessory device so that the accessory device can be automatically muted at the beginning of an audio program then unmuted at the conclusion of the audio program (e.g., a smartphone should not be allowed to ring in a theater environment). The signal could be sent from the hearing assistance device or from an audio provisioning device, or a device associated therewith. The mode of the hearing assistance device can be adjusted based on characteristics of the venue or the audio program. For example, the hearing device can be placed in a more linear mode at a music concert or an opera to better capture source dynamics. In a rock concert scenario, the hearing device can be placed in a more compressed state, following guidance for safe noise dosage for example.

By way of further example, a museum exhibit may be set-up such that a hearing device wearer moves from one exhibit area or zone to another. Each exhibit area can have its own audio stream to provide the hearing device wearer with information on that exhibit. Beacon devices can be placed at the entrance to each exhibit area or zone to trigger a change from the previous exhibit audio stream to an upcoming exhibit audio stream. The beacon devices used to trigger the change in the stream can be of a variety of communications as described earlier. Other techniques besides beacons can also be used, such as geofences, specialized antennas or other electromagnetic wave emitters, or the like. In some embodiments, a museum or similar environment can have multiple audio streams that play the same source file, but differ in time (such as based on when the user arrives to the exhibit zone).

In another representative scenario, audio can be streamed to a hearing device wearer, but the hearing device can be directed to also keep its microphones on so the wearer has access to acoustic information within the environment (e.g., when driving a car and listening to the radio, when receiving a stream from a remote microphone of one person but where other communication partners who aren't "mic-ed up" are also present, etc.). This is in contrast to a movie theater where environmental acoustics may be undesirable and the microphones on the devices could be muted. The user's experience can also be influenced based upon how the hearing device(s) are programmed to meet the needs/preferences of the end user.

In some theater situations, certain channels of the pre-recorded audio may be played back via loudspeakers while other channels may be presented via the hearing assistance device. For example, the surround sound channels may presented to the entire audience via the theater's loudspeakers, while the center channels, which are frequently utilized for delivering dialogue, may be presented to the audience via the hearing assistance device such that the dialogue may be individualized for one or more users of the assistive listening system. In this example, it may be beneficial for the microphone of the hearing assistance device to remain active, even though the user is in a theater environment.

In some embodiments, the user may be given certain controls relating to the operation of one or more of the assistive listening system and the hearing assistance device. For example, the user may be given the option to control the balance between acoustic input playback levels relative to streamed audio input playback levels. As a further example, some embodiments may provide the user with the ability to fine-tune the audio delay synchronization or HRTF filters to the preferences of the individual user. These adjustments may be directed by the user using any suitable user interface method, e.g., button press, gesture, graphic user-interface (GUI), and the like. In some embodiments, the user's preferences may be stored in the memory of one or more of the hearing assistance device, the assistive listening system, an accessory device, and an operatively connected server such as the cloud.

Data and/or signals can be exchanged between the accessory device 902 and one or both of the hearing assistance devices (as well as from an accessory device to another location or device) using various techniques including, but not limited to inductive techniques (such as near-field magnetic induction—NFMI), 900 MHz communications, 2.4 GHz communications, communications at another frequency, FM, AM, SSB, BLUETOOTH®, Low Energy BLUETOOTH®, Long Range BLUETOOTH®, IEEE 802.11 (wireless LANs) wi-fi, 802.15 (WPANs), 802.16 (WiMAX), 802.20, and cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is also possible that forms of wireless mesh networks may be utilized to support communications between various devices, including devices worn by other individuals. It is understood that the standards which can be used include past and present standards. It is also contemplated that future versions of these standards and new future standards may be employed without departing from the scope of the present subject matter.

Audio communication devices, audio provisioning devices, and/or assistive listening device accessory devices herein can include various different components. In some embodiments, an assistive listening device accessory device can be a personal communications device, such as a smart phone.

Figure 10:
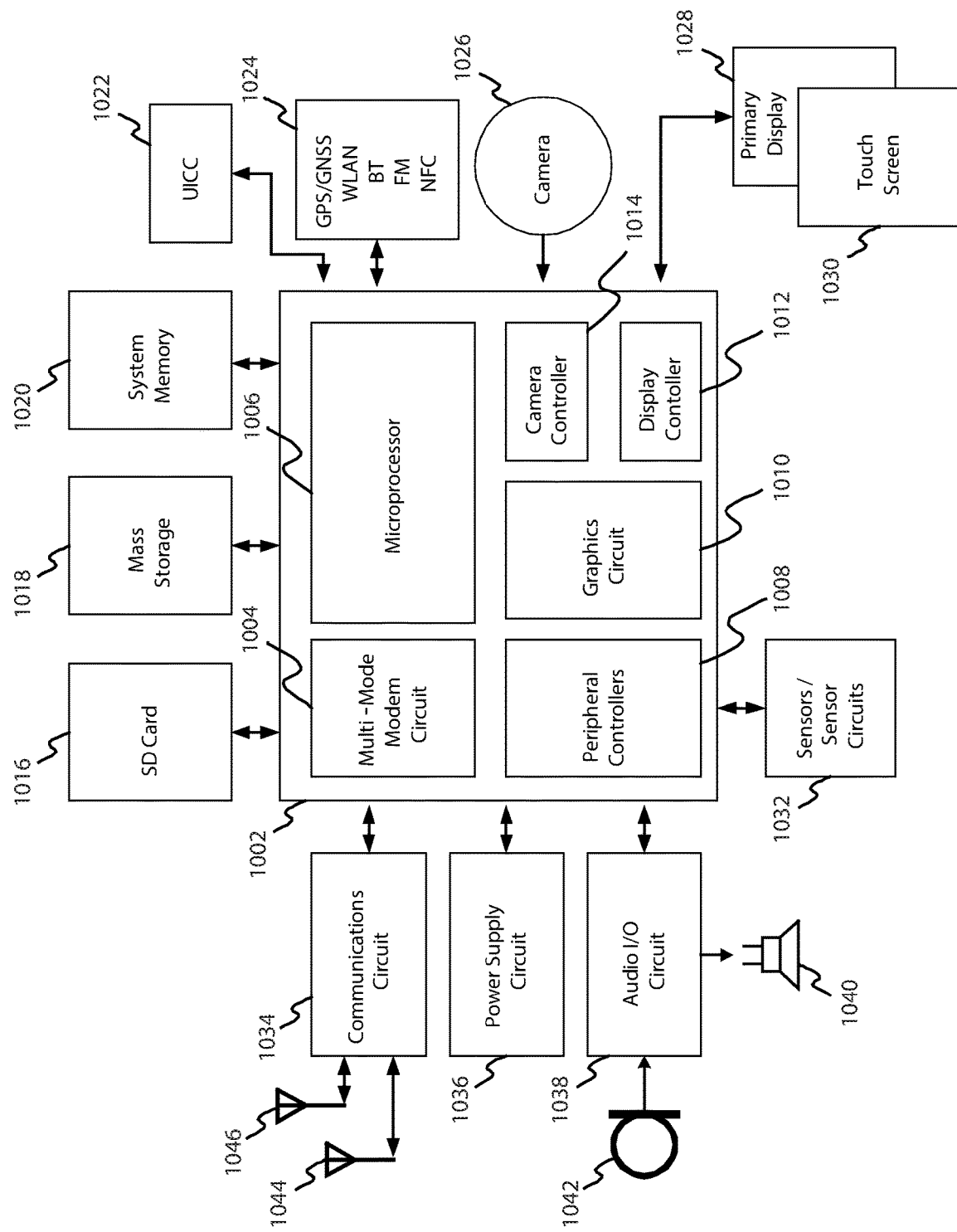
FIG. 10 is a schematic block diagram of some components of an audio communication device, an audio provisioning device, or an assistive listening device accessory device in accordance with various embodiments herein.

Referring now to FIG. 10, a schematic block diagram is shown of components of an audio communication device, an audio provisioning device, and/or an assistive listening device accessory device in accordance with various embodiments herein. This block diagram is just provided by way of illustration and it will be appreciated that devices herein can include greater or lesser numbers of components. The device in this example can include a control circuit 1002. The control circuit 1002 can include various components which may or may not be integrated. In various embodiments, the control circuit 1002 can include a microprocessor 1006, which could also be a microcontroller, FPGA, ASIC, or the like. The control circuit 1002 can also include a multi-mode modem circuit 1004 which can provide communications capability via various wired and wireless standards. The control circuit 1002 can include various peripheral controllers 1008. The control circuit 1002 can also include various sensors/sensor circuits 1032. The control circuit 1002 can also include a graphics circuit 1010, a camera controller 1014, and a display controller 1012. In various embodiments, the control circuit 1002 can interface with an SD card 1016, mass storage 1018, and system memory 1020. In various embodiments, the control circuit 1002 can interface with universal integrated circuit card (UICC) 1022. A spatial location determining circuit can be included and can take the form of an integrated circuit 1024 that can include components for receiving signals from GPS, GLONASS, BeiDou, Galileo, SBAS, WLAN, BT, FM, and NFC type protocols.

In various embodiments, the mobile electronic device can include a camera 1026. In various embodiments, the control circuit 1002 can interface with a primary display 1028 that can also include a touch screen 1030 or another suitable user control interface. In various embodiments, an audio I/O circuit 1038 can interface with the control circuit 1002 as well as a microphone 1042 and a speaker 1040. In various embodiments, a power supply circuit 1036 can interface with the control circuit 1002 and/or various other circuits herein in order to provide power to the system. In various embodiments, a communications circuit 1034 can be in communication with the control circuit 1002 as well as one or more antennas (1044, 1046).

Guidance Systems

In some embodiments, systems herein can provide guidance to a wearer of an assistive listening device. Guidance can include guiding the assistive listening device wearer to a particular location, such as to a particular sound field they are authorized to receive audio streams in. Assistive listening device wearers can also be guided to an area that offers audio streams they require or have requested or selected. For example, an attendee at a conference may select specific sessions they wish to attend located in different sound fields. The assistive listening device can provide guidance to the wearer in order to get to the selected specific sessions.

Guidance can also include guiding the assistive listening device wearer away from a particular location, such as away from a particular sound field they are not authorized to receive audio streams in.

Guidance may be provided in various ways. In some embodiments, a virtual audio interface can be configured to synthesize three-dimensional (3-D) audio that guides the assistive listening device wearer to a particular location or away from a particular location. For example, a synthesized 3-D virtual audio target can be generated at the specified location relative to the wearer's current position. In response, the wearer moves in the specified direction indicated by the audio target.

According to some embodiments, the virtual audio interface can generate audio cues comprising spatialized 3-D virtual sound emanating from virtual spatial locations (such as waypoints) that serve as targets for guiding wearer movement. The sound generated at the virtual spatial locations can be any broadband sound, such as complex tones, noise bursts, human speech, music, etc. or a combination of these and other types of sound. In various embodiments, the virtual audio interface is configured to generate binaural or monaural sounds, alone or in combination with spatialized 3-D virtual sounds. The binaural and monaural sounds can be any of those listed above including single-frequency tones.

In other embodiments, the virtual audio interface is configured to generate human speech that guides the wearer towards or away from a particular location, such as a particular sound field. The speech can be synthesized speech or a pre-recording of real speech. In embodiments that employ a single assistive listening device (for one ear), for example, the virtual audio interface generates monaural sound in the form of speech, which can be accompanied by other sounds, such as single or multi-frequency tones, noise bursts or music. In embodiments that employ two assistive listening devices (one device for each ear), the virtual audio interface can generate monaural or binaural sound in the form of speech, which can be accompanied by other sounds, such as single or multi-frequency tones, noise bursts or music. The virtual audio interface can display (play back) spoken instructions to guide the wearer though specific physical movements of a maneuver or routine. Further aspects of virtual audio interfaces are described in commonly owned U.S. patent application Ser. No. 15/589,298, titled "Hearing Assistance Device Incorporating Virtual Audio Interface for Therapy Guidance", the content of which is herein incorporated by reference in its entirety Language Preference Based Stream Initiation/Transmission As referenced above, a control circuit can be configured to issue a communication to an audio communication device or audio provisioning device including a language preference specific to a wearer of the assistive listening device. However, language preferences specific to a wearer of the assistive listening device can also be used for other purposes. For example, in some embodiments, a language of a given audio source or stream can be determined (such as by evaluating data associated with the audio source or stream, using a translation facility, a language translation API or the like) and then, if the language matches a preference for a wearer of an assistive listening device, various operations (such as notifying, transmitting, initiating, playing, etc.) can be undertaken in order to transmit the audio in the desired language to the wearer of the assistive listening device. In some embodiments, an audio source or stream that is not in a language matching a preference for a wearer of an assistive listening device can be deprioritized, blocked, muted (fully or partially), or the like.

In some embodiments, an audio communication device or an audio provisioning device can automatically transmit audio streams in a language matching a preference for a wearer of an assistive listening device on to the assistive listening device (directly or indirectly). In some embodiments, an accessory device (such as those described above) can automatically transmit audio streams in a language matching a preference for a wearer of an assistive listening device on to the assistive listening device (directly or indirectly). In some embodiments, the accessory device can translate audio to determine if it matches a language preference and transmit the audio onto the assistive listening device(s).

In some embodiments, an audio communication device, audio provisioning device, or an assistive listening device accessory is included herein having a control circuit; a power supply circuit in electrical communication with the control circuit; and a communications circuit in electrical communication with the control circuit. The device configured to evaluate one or more audio streams to determine the language of the audio, compare the language to a language preference of a wearer of an assistive listening device, and transmit the audio stream to the assistive listen device when the language of the audio matches the language preference. In some embodiments, a method is included herein, the method including evaluating one or more audio streams to determine the language of the audio, comparing the language to a language preference of a wearer of an assistive listening device, and transmitting the audio stream to the assistive listen device when the language of the audio matches the language preference.

Sensors

Assistive listening devices herein can include one or more sensor packages to provide data to determine various aspects including, but not limited to, tracking movement of a device wearer and tracking aspects about the device wearer. In various embodiments, sensors associated with sensor packages herein can be used to track a device wearer's location, such as with respect to geofenced areas or with respect to beacons, during navigation to entry areas, to particular sound fields, away from particular sound fields, within particular sound fields, etc. In some embodiments, the sensors associated with the sensor package can be used to further determine the head position of the device wearer. In various embodiments sensors associated with sensor packages herein can be used for user authentication, such as by using unique user markers to ensure that the individual receiving the audio stream is the intended individual.

The sensor package can comprise one or a multiplicity of sensors. In some embodiments, the sensor packages can include one or more motion sensors amongst other types of sensors. Motion sensors herein can include inertial measurement units (IMU), accelerometers, gyroscopes, barometers, altimeters, and the like. Motions sensors can be used to track movement of a subject in accordance with various embodiments herein.

In some embodiments, the motion sensors can be disposed in a fixed position with respect to the head of a subject, such as worn on or near the head or ears. In some embodiments, the motion sensors can be worn on or near another part of the body such as on a wrist, arm, or leg of the subject.

Sensor packages herein can also include one or more of a magnetometer, microphone, acoustic sensor, electrocardiogram (ECG), electroencephalography (EEG), eye movement sensor (e.g., electrooculogram (EOG) sensor), myographic potential electrode (EMG), heart rate monitor, pulse oximeter, magnetic sensor, a telecoil, a temperature sensor, a wireless radio antenna, a barometer, a global positing system (GPS) and the like.

In some embodiments, the sensor package can be part of an assistive listening device. However, in some embodiments, the sensor packages can include one or more additional sensors that are external to an assistive listening device. The one or more additional sensors can comprise one or more of an IMU, accelerometer, gyroscope, barometer, magnetometer, magnetic sensor, telecoil, acoustic sensor, eye motion tracker, EEG or myographic potential electrode (e.g., EMG), GPS, temperature sensor, heart rate monitor, and pulse oximeter. For example, the one or more additional sensors can include a wrist-worn or ankle-worn sensor package, or a sensor package supported by a chest strap.

The sensor package of a hearing assistance device can be configured to sense motion of the wearer. Data produced by the sensor(s) of the sensor package can be operated on by a processor of the device or system.

According to various embodiments, the sensor package can include one or more of an IMU, and accelerometer (3, 6, or 9 axis), a gyroscope, a barometer, an altimeter, a magnetometer, a magnetic sensor, an eye movement sensor, a pressure sensor, an acoustic sensor, a telecoil, a heart rate sensor, an electrical signal sensor (such as an EEG, EMG or ECG sensor), a GPS, a temperature sensor, a blood pressure sensor, an oxygen saturation sensor, an optical sensor, and the like As used herein the term "inertial measurement unit" or "IMU" shall refer to an electronic device that can generate signals related to a body's specific force and/or angular rate. IMUs herein can include one or more of an accelerometer (3, 6, or 9 axis) to detect linear acceleration and a gyroscope to detect rotational rate. In some embodiments, an IMU can also include a magnetometer to detect a magnetic field.

The eye movement sensor may be, for example, an electrooculographic (EOG) sensor, such as an EOG sensor disclosed in commonly owned U.S. Pat. No. 9,167,356, which is incorporated herein by reference. The pressure sensor can be, for example, a MEMS-based pressure sensor, a piezo-resistive pressure sensor, a flexion sensor, a strain sensor, a diaphragm-type sensor and the like.

The temperature sensor can be, for example, a thermistor (thermally sensitive resistor), a resistance temperature detector, a thermocouple, a semiconductor-based sensor, an infrared sensor, or the like.

The blood pressure sensor can be, for example, a pressure sensor. The heart rate sensor can be, for example, an electrical signal sensor, an acoustic sensor, a pressure sensor, an infrared sensor, an optical sensor, or the like.

The oxygen saturation sensor can be, for example, an optical sensor, an infrared sensor, or the like.

The electrical signal sensor can include two or more electrodes and can include circuitry to sense and record electrical signals including sensed electrical potentials and the magnitude thereof (according to Ohm's law where $V=IR$) as well as measure impedance from an applied electrical potential.

The sensor package can include one or more sensors that are external to the hearing assistance device. In addition to the external sensors discussed hereinabove, the sensor package can comprise a network of body sensors (such as those listed above) that sense movement of a multiplicity of body parts (e.g., arms, legs, torso).

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. An assistive listening device comprising:
a control circuit;
an electroacoustic transducer for generating sound in electrical communication with the control circuit;
a power supply circuit in electrical communication with the control circuit;
a communications circuit in electrical communication with the control circuit; and
a vent
wherein the control circuit is configured to
issue a communication to an audio communication device or audio provisioning device including at least one of
a language preference specific to a wearer of the assistive listening device;
a set of hearing requirements specific to a wearer of the assistive listening device;
data regarding a presentation delay specific to the assistive listening device; and
an authorization status identifier, digital code, digital token, or digital key specific to a wearer of the assistive listening device;
wherein the assistive listening device is configured to receive an audio stream from the audio communication device or audio provisioning device or a device in communication with the audio communication device or audio provisioning device selected from a plurality of possible audio streams based on at least one of
a language preference specific to a wearer of the assistive listening device;
a set of hearing requirements specific to a wearer of the assistive listening device;
data regarding a presentation delay specific to the assistive listening device;
an authorization status specific to a wearer of the assistive listening device; and
classification data regarding a listening environment; and
wherein the vent is actuated to provide acoustic separation from ambient sounds when the assistive listening device receives an audio stream.

2. The assistive listening device of claim 1, further comprising
a motion sensor in electrical communication with the control circuit; and
a microphone in electrical communication with the control circuit.

3. The assistive listening device of claim 1, wherein the issued communication includes at least two of
a language preference specific to a wearer of the assistive listening device;
a set of hearing requirements specific to a wearer of the assistive listening device;
data regarding a presentation delay specific to the assistive listening device; and
an authorization status, code or key specific to a wearer of the assistive listening device.

4. The assistive listening device of claim 1, wherein the received audio stream includes speech in a language matching the previously provided language preference specific to the wearer of the assistive listening device.

5. The assistive listening device of claim 1, wherein the control circuit is configured to issue the communication to the audio communication device or audio provisioning device via a first communication protocol and the received audio stream is received via a second communication protocol.

6. The assistive listening device of claim 1, the authorization status comprising a digital key or authorization code verifying that the wearer of the assistive listening device is authorized to receive a particular audio stream.

7. The assistive listening device of claim 6, wherein the audio stream is received utilizing a BLUETOOTH® or BLUETOOTH® Low Energy communication protocol.

8. The assistive listening device of claim 1, wherein data regarding a presentation delay specific to the assistive listening device comprises a presentation delay.

9. The assistive listening device of claim 1, further comprising converting the audio stream into sound using the electroacoustic transducer.

10. The assistive listening device of claim 9, further gathering ambient sound data with a microphone, processing the ambient sound data to obtain an ambient sound input stream, mixing the ambient sound input stream and the audio stream into a combined sound stream, and converting the combined sound stream into sound using the electroacoustic transducer.

11. A method of operating an assistive listening device comprising
storing configuration data on the assistive listening device, the configuration data comprising at least one of
presentation delays of the assistive listening device;
a language preference of an individual associated with the assistive listening device;
hearing requirements of the individual associated with the assistive listening device;
an authorization status of either the assistive listening device or an individual associated with the assistive listening device;
issuing a communication from the assistive listening device to an audio communication device or audio provisioning device upon detection of the assistive listening device entering a sound field, the communication including at least one of piece of the configuration data.

12. The method of operating an assistive listening device of claim 11, further comprising detecting a present location of the assistive listening device or audio communication device or audio provisioning device.

13. The method of operating an assistive listening device of claim 12, further comprising applying a head-related transform function to the audio based on one or more of the present location and orientation of the assistive listening device.

14. The method of operating an assistive listening device of claim 11, further comprising issuing the communication in response to a query received from the audio communication device or audio provisioning device.

15. An audio communication device or audio provisioning device comprising:
a control circuit;
a power supply circuit in electrical communication with the control circuit;
a communications circuit in electrical communication with the control circuit;
the audio communication device or audio provisioning device configured to
receive communications regarding a plurality of assistive listening devices, the communications comprising at least one of a language preference specific to a wearer of an assistive listening device;

a set of hearing requirements specific to a wearer of an assistive listening device;

data regarding a presentation delay specific to an assistive listening device;

an authorization status specific to a wearer of an assistive listening device; and classification data regarding the listening environment;

the audio communication device or audio provisioning device further configured to select appropriate audio streams for assistive listening devices from which communications have been received based on the received communications from the plurality of assistive listening devices;

determine whether a prerecorded audio file is available in a specific language corresponding to a language preference received from a hearing assistance; and send the selected audio streams to the plurality of assistive listening devices in different languages based on language preferences received from the plurality of assistive listening devices.

16. The audio communication device or audio provisioning device of claim 15, wherein the audio communication device or audio provisioning device is configured to receive communications regarding a plurality of assistive listening devices from devices associated with assistive listening device wearers other than the plurality of assistive listening devices.

17. The audio communication device or audio provisioning device of claim 15, further comprising sending the prerecorded audio file as an audio stream if available.

18. The audio communication device or audio provisioning device of claim 15, further comprising obtaining a translation of an audio source and sending the translation if a prerecorded audio file is not available.

* * * * *